United States Patent [19]

Daws et al.

[11] 4,307,053

[45] Dec. 22, 1981

[54] METHOD AND APPARATUS FOR PROCESSING COMPRESSIBLE MATERIAL

[75] Inventors: John W. Daws, Newark; Gregory C. Brock, Granville, both of Ohio

[73] Assignee: Owens-Corning Fiberglas Corporation, Toledo, Ohio

[21] Appl. No.: 179,372

[22] Filed: Aug. 18, 1980

[51] Int. Cl.³ .......................................... B29D 23/10
[52] U.S. Cl. .................... 264/165; 264/119; 264/257; 264/285; 264/339; 425/505; 425/515; 425/112; 425/393
[58] Field of Search ............... 264/165, 119, 134, 257, 264/285, 296, 339; 425/505, 112, 515, 393

[56] References Cited

U.S. PATENT DOCUMENTS

| | | | |
|---|---|---|---|
| 3,050,106 | 8/1962 | Pusch et al. | 156/457 |
| 3,337,386 | 8/1967 | Burr | 425/505 |
| 3,726,623 | 4/1973 | Ferstenberg | 425/112 |
| 3,740,207 | 6/1973 | Bogrets et al. | 264/339 |
| 3,939,022 | 2/1976 | Lacon | 264/257 |
| 4,029,461 | 6/1977 | Lacon | 425/384 |
| 4,038,018 | 7/1977 | Pepmeier | 425/112 |
| 4,087,223 | 5/1978 | Angioletti et al. | 425/112 |
| 4,115,498 | 9/1978 | Kissell et al. | 264/119 |
| 4,161,379 | 7/1979 | Sudyk | 425/112 |

Primary Examiner—Jeffery R. Thurlow
Attorney, Agent, or Firm—Ronald C. Hudgens; Philip R. Cloutier; Ted C. Gillespie

[57] ABSTRACT

A method and apparatus for processing compressible insulation material of mineral fibers in which a folding shoe guides the insulation material from a strip condition into a cylindrical condition and further including initially compressing the portion of the strip material along the centerline thereof, subsequently compressing the portions of the strip material intermediate the center line and the side edges of the strip material, and, finally, compressing the side edge portions of the strip material.

11 Claims, 8 Drawing Figures

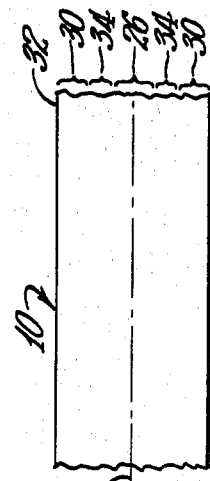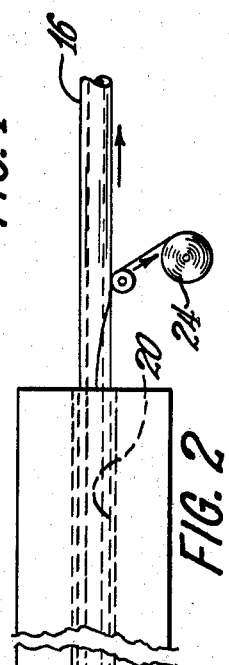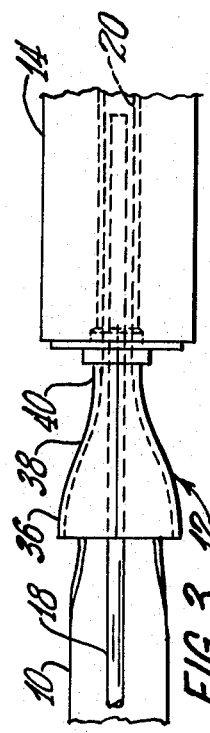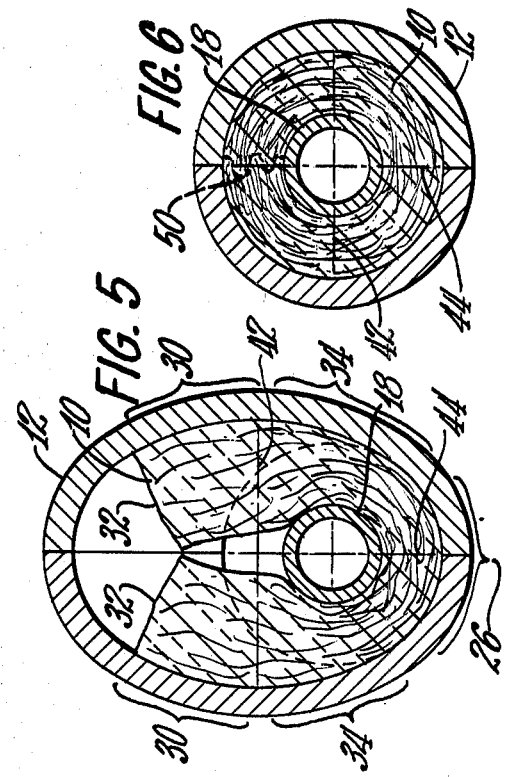

METHOD AND APPARATUS FOR PROCESSING COMPRESSIBLE MATERIAL

TECHNICAL FIELD

This invention pertains to handling compressible strip material, such as fibrous mineral insulation material. In one of its more specific aspects, this invention relates to guiding compressible fibrous material containing a heat-hardenable binder into a cylindrical shape and compressing the material to prepare it for subsequent heating to cure the binder.

BACKGROUND OF THE INVENTION

A common method for forming cylindrical products from fibrous material, such as pipe insulation, is to helically wind rectangular strips of fibrous material on a mandrel, and place the mandrel within a mold where the material is heated and compressed to cure the binder on the fibers, thereby forming a cylindrical insulation product. A variation of this method is a batch process in which the fibrous material is clamped between two mold halves and then heated and compressed. Helical winding and batch processes are slow and require large amounts of capital and labor. Another process for producing cylindrical insulation products is a continuous molding process in which a strip of fibrous material is folded to a cylindrical shape and fed through a cylindrical mold which compresses and/or heats the material to cure it, thereby continuously producing a substantially rigid insulation product. A guide shoe is ordinarily used to continuously fold the flat strip of insulation material so that the side edges join to form the strip into a cylindrical shape. The guide shoes also compress the material prior to its advancement into the curing apparatus. Continuous molding processes of the prior art generally use axially symmetric folding shoes, such as conical or parabolic shoes, to form and compress the strips into cylindrical shape.

One of the problems associated with the continuous insulation manufacturing processes of the prior art is that the portion of the product near the seam created where the sides of the strip material are adjoined, usually at the top of the cylindrical insulation piece, is structurally weak. Advantageously, the edges of the strip material will be bonded together so that the seam is neither visually nor structurally evident. In practice, however, the seams of pipe insulation made by the devices of the prior art are weak, and subsequent fabrication operations, such as slitting pipe insulation pieces for packaging, often result in defective products due to separation at the seam. Another problem associated with the continuous molding of pipe insulation material is that the forces placed on the strip material passing through the folding shoe are sometimes so great that breakage or unacceptable folding of the strip material occurs. The use of axially symmetric folding shoes contributes to undue tension in the strip material. The apparatus and method of this invention are directed towards solution of the above problems.

SUMMARY OF THE INVENTION

According to this invention, there is provided a method for guiding compressible strip material into a cylindrical shape of the type in which the strip material is passed lengthwise through a folding shoe, the portion of the strip material along the centerline of the strip material is compressed, the portions of the strip material intermediate the centerline and the side edges of the strip material are compressed, and the side edge portions of the strip material are compressed.

In a specific embodiment of the invention, the strip material is caused to migrate in the direction from the centerline to the side edges as the strip material passes through the folding shoe.

According to this invention, there is also provided a method for processing compressible insulation material of mineral fibers of the type in which the insulation material is passed through a folding shoe which guides the insulation material from a flat condition to a shape having a generally circular cross section, the insulation material is folded around a cylindrical mandrel positioned within the folding shoe and the insulation material at the bottom of the mandrel is compressed, the portions of insulation material at the sides of the mandrel are subsequently compressed, thereby causing some of the insulation material to migrate upwardly toward a position above the mandrel, and, finally, the insulation material at the top of the mandrel is compressed. It has been found that the progressive compression of the insulation material from the centerline of the strip to the edges of the strip, or from the bottom of the mandrel to the top of the mandrel, results in a higher concentration of insulation material and binder in the area of the seam. The greater concentration of insulation in the seam area results in a stronger and more preferable insulation product.

In a specific embodiment of the invention, the insulation material is pulled through the folding shoe with a web material.

According to this invention, there is also provided a fibrous mineral pipe insulation product made according to the method of the invention.

According to this invention, there is also provided a pipe insulation product of the type formed from a flat strip of fibrous mineral insulation material folded into a cylindrical shape and joined by compression at the seam, where the portion of the product nearest the seam has a density within the range of from about 10 percent to about 30 percent, by weight, greater than that of the remaining portions of the insulation product.

In a specific embodiment of the invention, the portion of the product nearest the seam has a density of about 20 percent greater than that of the remaining portions of the product.

According to this invention, there is also provided apparatus for guiding compressible strip material into a cylindrical shape of the type in which the strip material is passed lengthwise through a folding shoe, where the inlet portion of the folding shoe is adapted to compress the portion of the strip material along the centerline of the strip material, the intermediate portion of the folding shoe is adapted to compress the portions of the strip material intermediate the centerline and the side edges of the strip material, and the outlet portion of the folding shoe is adapted to compress the side edge portions of the strip material.

In a specific embodiment of the invention, the intermediate portion of the folding shoe is adapted to cause the strip material to migrate in the direction from the centerline to the side edges.

In a preferred embodiment of the invention, means for driving a web material to pull the strip material through the folding shoe is provided.

According to this invention, there is also provided apparatus for processing compressible insulation material of mineral fibers of the type in which the insulation material is passed lengthwise through a folding shoe, positioned in which is a cylindrical mandrel, where the outlet portion of the folding shoe is adapted to fold the insulation material around the mandrel and adapted to compress the insulation material at the bottom of the mandrel, the intermediate portion of the folding shoe is adapted to compress the portions of the insulation material at the sides of the mandrel and to cause some of the insulation material at the sides of the mandrel to migrate upwardly toward a position above the mandrel, and the outlet portion of the folding shoe is adapted to compress the insulation material at the top of the mandrel.

In a specific embodiment of the invention, the cross section of the inlet portion of the folding shoe is an ellipse.

In another embodiment of the invention, the ellipse has a horizontal major axis.

In a preferred embodiment of the invention, the center of the ellipse is positioned above the center of the mandrel.

In another preferred embodiment of the invention, the horizontal axis of the ellipse becomes shorter from the inlet portion of the folding shoe to the intermediate portion, and the vertical axis of the ellipse becomes shorter from the intermediate portion to the outlet portion.

In the most preferred embodiment of the invention, the folding shoe has the shape of an elliptical cycloid.

DESCRIPTION OF THE DRAWINGS

FIG. 1 is a schematic plan view of a portion of a strip of insulation material.

FIG. 2 is a schematic view in elevation of the apparatus for forming cylindrical products from the strips of insulation material according to the principles of the invention.

FIG. 3 is a schematic plan view of the apparatus of FIG. 2.

FIGS 4, 5 and 6 illustrate views of the apparatus taken along lines 4—4, 5—5 and 6—6, respectively, of FIG. 2.

DESCRIPTION OF THE INVENTION

Figure 7:
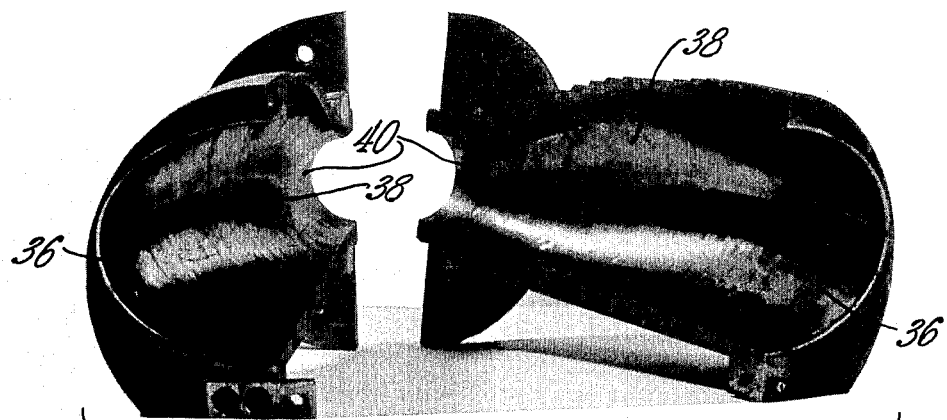
FIG. 7 is a perspective view of the two halves of a folding shoe according to the principles of the invention.
Figure 8:
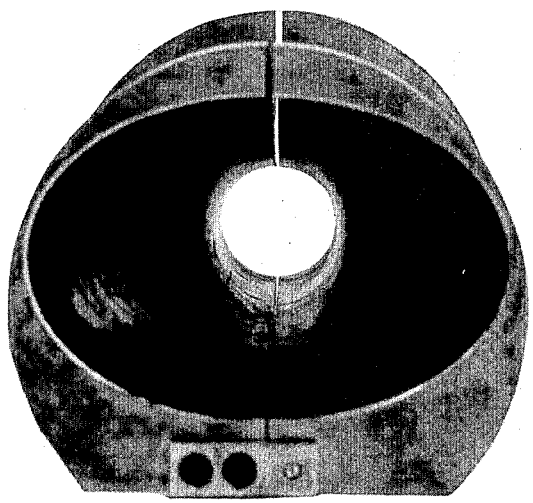
FIG. 8 is an end perspective view of the folding shoe of FIG. 7.

As shown in FIG. 2, the insulation strip material 10 is advanced through folding shoe 12 where it is folded into a cylindrical shape and compressed prior to being advanced into die 14. As the material is advanced through the die, it is heated to a temperature sufficient to cure the binder on the insulation material. The use of such dies is well known in the prior art. Emanating from the die us the cured cylindrical pipe insulation product 16. Positioned within the folding shoe and die is mandrel 18, which together with die bore 20 defines a die opening having an annular cross section. The apparatus can be adapted with web material 22 and web take-up reel 24 to assist in pulling the insulation material through the folding shoe and the die in the manner well known in the art.

As shown in FIG. 1, the strip insulation material can be divided into three portions, center portion 26 adjacent centerline 28, side edge portions 30 adjacent side edges 32, and intermediate portions 34 which is intermediate the center portion and the side edge portions.

In order to provide the desired compression of the folded insulation material, the folding shoe is comprised of three portions, each providing compression for a different part of the insulation material. As shown in FIGS. 3 and 7, the folding shoe is comprised of inlet portion 36, intermediate portion 38 and outlet portion 40. For ease of construction and handling, the folding shoe can be formed in two halves, as shown in FIG. 7.

As shown in FIGS. 4 through 6, when the insulation material is folded around the mandrel into a cylindrical shape, the center portion of the insulation is positioned at the bottom of the mandrel, the intermediate portions of the insulation are positioned at the sides of the mandrel and the side edge portions of the insulation are positioned at the top of the mandrel. As shown in the cross-sectional view in FIG. 4, the center portion of the insulation material, which is at the bottom of the mandrel, is compressed.

As the insulation material is advanced from the inlet portion of the folding shoe to the intermediate portion of the folding shoe, the intermediate portions of the insulation material at the sides of the mandrel are compressed, as shown in FIG. 5. Because of the compression at the sides of the mandrel, the insulation material has a tendency to migrate upwardly, in a direction from the centerline of the insulation material toward the side edges of the insulation material. This has the effect of concentrating more of the insulation material above the top of the mandrel.

As the insulation material is advanced to the outlet portion of the folding shoe, the side edge portions of the insulation material at the top of the mandrel are joined and compressed, as shown in FIG. 6. Seam 50 is formed by the joining of the two side edges of the insulation material. As indicated by FIGS. 4, 5 and 6, the resulting insulation product has a higher density at the portion nearest the seam. The density of the portion nearest the seam, which is the side edge portion of the insulation material, can be within the range from about 10 percent to about 30 percent, by weight, greater than the density of the center and intermediate portions of the insulation material. In the preferred embodiment, the side edge portion of the insulation material has a density of about 20 percent greater than that of the remaining portions of the product.

As can be seen from FIG. 4, the cross section of the inlet portion of the folding shoe can be an ellipse having horizontal major axis 42 and vertical minor axis 44. Also, center 46 of the ellipse can be positioned above center 48 of the mandrel. As shown in FIG. 5, the horizontal axis of the ellipse becomes shortened as the insulation material is advanced from the inlet portion to the intermediate portion of the folding shoe. The vertical axis of the ellipse is shortened as the insulation material is advanced from the intermediate portion to the outlet portion of the folding shoe, as shown in FIG. 6. In the best mode of the invention, the folding shoe is in the shape of an elliptic cycloid, represented by the following equations:

$$b(x) = b(o) + b(L)\left[\left(\frac{x - 1_b}{L - 1_b}\right) - \frac{1}{2\pi}\sin\left(\frac{2\pi(x - 1_b)}{L - 1_b}\right)\right]$$

where $1_b < x \leq L$

-continued $$b(x) = b(o) = \text{(a constant) where } x \leq 1_b$$

$$a(x) = a(o) + a(L)\left[\left(\frac{x}{L - 1_a}\right) - \frac{1}{2\pi}\sin\left(\frac{2\pi x}{L - 1_a}\right)\right]$$

where $o \leq x < (L - 1_a)$ $a(x) = a(o) =$ (a constant) where $(L - 1_a) \leq x \leq L$ where x is the distance from the entrance to the die, a(x) is one half the vertical axis of the folding shoe cross section, b(x) is one-half the horizontal axis of the folding shoe cross section, $1_a$ is the length of the inlet portion of the folding shoe, $1_b$ is the length of the outlet portion of the folding shoe, and L is the length of the folding shoe.

Although the cross section of the inlet portion of the folding shoe is shown as being elliptical in shape, it is to be understood that other geometric configurations can be used to provide the gradual compression and concentration of the insulation material according to the principles of the invention. Also, the principles of this invention will apply to products having non-circular cross sections.

EXPLOITATION IN INDUSTRY

This invention will be found to be useful in the manufacture of pipe insulation products, such as pipe insulation made from glass fibers.

We claim:

1. In a method for guiding compressible strip material into a cylindrical shape of the type in which the strip material is passed lengthwise through a folding shoe and wrapped around a mandrel positioned within said folding shoe, the improvement comprising:
   initially compressing the portions of the strip material along the centerline thereof;
   subsequently compressing the portions of the strip material intermediate said centerline and the side edges of the strip material to cause an upward migration of the intermediate and side edge portions of the strip material, thereby resulting in a heavier concentration of the strip material above the top of said mandrel; and, finally,
   compressing the side edge portions of the strip material at the top of the mandrel so that the density of the side edge portion is greater than the density of the center and intermediate portions of the strip material.

2. The method of claim 1 comprising pulling said strip material through said folding shoe with a web material.

3. In a method for processing compressible insulation material of mineral fibers of the type in which the insulation material is passed through a folding shoe which guides the insulation material from a flat condition to a shape having a generally circular cross section, the improvement comprising:
   initially folding the insulation material around a cylindrical mandrel positioned within said folding shoe and compressing the insulation material at the bottom of the mandrel;
   subsequently compressing the portions of insulation material at the sides of said mandrel, thereby causing some of the insulation material to migrate upwardly toward a position above said mandrel resulting in a higher concentration of the insulation material above said mandrel; and, thereafter,
   compressing the insulation material at the top of said mandrel so that the density of the insulation material at the top of said mandrel is greater than that at the sides and bottom of said mandrel.

4. The method of claim 1 comprising pulling said insulation material through said folding shoe with a web material.

5. In apparatus for guiding compressible strip material into a cylindrical shape of the type in which the strip material is passed lengthwise through a folding shoe and wrapped around a mandrel positioned within said folding shoe, the improvement comprising:
   the inlet portion of said folding shoe being adapted to compress the portion of the strip material along the centerline thereof;
   the intermediate portion of said folding shoe being adapted to compress the portions of the strip material intermediate said centerline and the side edges of the strip material to cause an upward migration of the intermediate and side edge portions resulting in a heavier concentration of the strip material above the top of the mandrel; and,
   the outlet portion of said folding shoe being adapted to compress the side edge portions of the strip material so that the density of the side edge portion is greater than the density of the center and intermediate portions of the strip material.

6. The apparatus of claim 5 comprising means for driving a web material to pull said strip material through said folding shoe.

7. In apparatus for processing compressible insulation material of mineral fibers of the type in which the insulation material is passed lengthwise through a folding shoe, position in which is a cylindrical mandrel, the improvement comprising:
   the inlet portion of said folding shoe being adapted to fold the insulation material around said mandrel and to compress the insulation material at the bottom of said mandrel;
   the intermediate portion of said folding shoe being adapted to compress the portions of the insulation material at the sides of said mandrel and to cause some of the insulation material at the sides of the mandrel to migrate upwardly toward a position above said mandrel resulting in a heavier concentration of the strip material above the top of the mandrel; and
   the outlet portion of said folding shoe being adapted to compress the insulation material at the top of said mandrel so that the density of the insulation material at the top of the mandrel is greater than at the sides and bottom of the mandrel.

8. The apparatus of claim 7 in which the cross section of said inlet portion is an ellipse.

9. The apparatus of claim 8 in which said ellipse has a horizontal major axis.

10. The apparatus of claim 9 in which the center of said ellipse is positioned above the center of said mandrel.

11. The apparatus of claim 10 in which the horizontal axis of the ellipse becomes shorter from said inlet portion of said folding shoe to said intermediate portion of said folding shoe, and in which the vertical axis of the ellipse becomes shorter from said intermediate portion of said folding shoe to said outlet portion of said folding shoe.

* * * * *